United States Patent [19]
Brown et al.

[11] 3,788,651
[45] Jan. 29, 1974

[54] INFLATABLE SEALS

[75] Inventors: William David Brown, Ashfordby; Richard Noel Thomson, Markfield, both of England

[73] Assignee: Dunlop Limited, London, England

[22] Filed: Dec. 20, 1972

[21] Appl. No.: 317,081

[30] Foreign Application Priority Data
Dec. 23, 1971 Great Britain.................... 59897/71

[52] U.S. Cl............ 277/34, 277/DIG. 6, 220/46 P, 156/110 C, 161/227
[51] Int. Cl............................................. F16j 15/46
[58] Field of Search ...... 277/34, 34.3, DIG. 6, 34.6; 138/126; 220/46 P; 156/110 C; 161/227

[56] References Cited
UNITED STATES PATENTS
| 943,023 | 12/1909 | Johnson................................ 277/34 |
| 3,339,931 | 9/1967 | Hundt et al........................ 277/34.3 |
| 3,642,291 | 2/1972 | Zeffer.................................... 277/34 |

*Primary Examiner*—Samuel B. Rothberg
*Attorney, Agent, or Firm*—Steven, Davis, Miller & Mosher

[57] ABSTRACT

An inflatable seal comprising a flexible wall portion and an inflatable chamber defined at least in part by the flexible wall portion, the flexible wall portion being formed from a synthetic rubber reinforced by one or more layers of fabric reinforcement formed from an aromatic polyamide, an aromatic polyimide, or an aromatic polyamide-imide. The seals made according to the present invention are particularly suited for application in which they are exposed to extreme conditions, for example steam at high pressure. Such applications includes autoclaves, and sterilising units, of which the following is a Specification.

8 Claims, 1 Drawing Figure

PATENTED JAN 29 1974  3,788,651
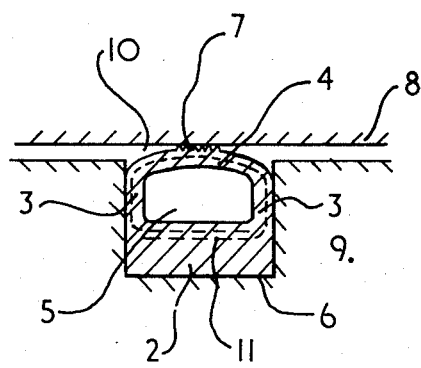

INFLATABLE SEALS

This invention relates to inflatable seals.

Inflatable seals are commonly used in applications where it is required to form a fluid-tight seal between two surfaces such as the confronting surfaces of the door and body of a pressure vessel, and they are particularly suitable for sealing between two surfaces which are slid into position relative to each other since they may be inflated to seal gaps of at least 0.040 of an inch. Thus they obviate the need to machine the confronting surfaces to the same degree of accuracy as is necessary when using relatively solid seals such as O-ring seals.

Conventionally, inflatable seals are located in a groove formed in one of a pair of confronting surfaces and inflation of the seal is arranged to cause an upper portion of the seal to deform into sealing contact with the other surface. The seals are built up of rubber with a flexible fabric reinforcement which retains the general shape of the seal against forces due to pressure differentials across the walls of the seal, whilst permitting an outer portion of the seal to deform outwards relative to the groove and form a fluid-tight seal across the gap between a pair of surfaces.

The life of inflatable seals of this kind is, however, found to be limited since, in particular, in the region of the deformable upper portion of the seal, the reinforcement is in close proximity to fluid in the pressure vessel. If there is any degradation or cracking of the rubber on the surface of the seal the reinforcement is exposed to the fluid in the pressure vessel and will readily deteriorate. This is a particular problem in apparatus such as autoclaves and sterilising units which operate with steam at high temperatures and pressures.

According to one aspect of the present invention an inflatable seal comprises a flexible wall portion and an inflatable chamber defined at least in part by the flexible wall portion, the flexible wall portion being formed from synthetic rubber reinforced by one or more layers of the fabric reinforcement formed from an aromatic polyamide, an aromatic polyimide, or an aromatic polyamide-imide.

The aromatic polyamides used in the present invention are of the general formula:

where either or both $R_1$ and $R_2$ represent aromatic groups one such material is commercially available as "Nomex" from Du Pont.

Aromatic polyimides which may be used in the present invention are of the general formula:

where either or both $R_3$ and $R_4$ represent aromatic groups.

The aromatic polyamide-imide materials which may be used in the present invention are of the general formula:

where either or both $R_5$ and $R_6$ represent aromatic groups, one example of this type of material is commercially available as "Kermel" from Rhone Poulenc.

In general, the flexible wall portion with the seals according to the present invention may be made of any synthetic rubber. However, when the seal is to be used in conditions such that it would be subjected to, for example steam at high temperatures and pressures, it is preferred to make the flexible wall of the seal, or at least part thereof, of a silicone rubber. In particular it is preferred to use a silicone rubber based on methyl-vinyl polysiloxane. More particularly, it is preferred to use a no post cure grade of methyl-vinyl polysiloxane, as such materials obviate the need to expose the seal to high curing temperatures which would cause a reduction in the strength of the reinforcing fabric. These rubbers also exhibit improved resistance to degradation on exposure to high pressure steam. When the seal is only partially made of these silicone rubbers, they should be used on the external surface of the flexible wall which is to be exposed on the extreme conditions.

One embodiment of the invention will now be described with reference to the accompanying drawing, which shows a cross-section of a seal.

An inflatable seal comprises in cross-section a base portion 2, a pair of sidewall portions 3 extending from the base portion 2, and a flexible wall or sealing portion 4 extending between the sidewall portions 3 in spaced superimposed relationship, relative to the base portion 2.

The four portions are integral with each other and form the walls of an inflatable chamber 5 which may be inflated to expand the seal. The seal may be located in a groove 6 formed in, for example, the body 9 of a pressure vessel and may be inflated to expand the seal and move the flexible sealing portion 7 of the seal into sealing contact with a door 8 of the pressure vessel so as to seal the gap 10 between the door 8 and the body 9.

The seal is constructed from a no post cure grade of methyl-vinyl polysiloxane which has embedded therein one layer of fabric reinforcement 11 which is arranged to surround the inflatable chamber. The reinforcement 11 overlaps along the length of the seal in the base portion 2 and thereby imparts greater rigidity to the base portion compared with the remainder of the seal.

The fabric reinforcement 11 is woven from 200 denier yarns of aromatic polyamide containing substituted phenylene groups, such material is commercially available as "Nomex" from Du Pont.

Reinforcement formed from yarns made of aromatic polyamides, aromatic polyimides or aromatic polyamide-imides, such as "Nomex" or "Kermel," can withstand higher temperatures than conventional reinforcement fabrics formed from polyamides such as Nylon 6/6 or polyethylene terephthalates such as "Terylene." Typically reinforcement fabrics of the conventional kind are referred to have a melting point in the order of 250°C., while, for example, aromatic polyamides containing substituted phenylene groups, i.e., "Nomex," can withstand temperatures of 380°C. with only charring. A further feature of reinforcing materials used in the present invention is that the fabric has a substantially improved bust strength compared with conventional polyethylene terephthalates. Table I shows comparatively the strengths of materials made from aromatic polyamides, commercially available as "Nomex," and polyethylene terephthalates, as determined by a Mullens Burst Test when the materials had been exposed for varying periods of time to steam at a pressure of 60 psi. and a temperature of 153°C.

TABLE I

| Time of exposure to steam (hr) | Mullens Burst Test strength (lb) |
| --- | --- |

| | Polyethylene terephthalates | Aromatic Polyamides containing substituted phenylene groups (Nomex) |
|---|---|---|
| 0 | 132 | 240 |
| 7 | 35 | 258 |
| 14 | 0 | 265 |
| 42 | 0 | 265 |
| 100 | 0 | 250 |

A similar comparison is made in Table II between polyethylene terephthalate fabric and a fabric made of aromatic polyamide-imide, commercially available as "Kermel."

TABLE II

| Time of exposure to steam at 60 psi and 153°C. (hrs) | Mullens Burst Pressure (lb/sq.in) | |
|---|---|---|
| | Terylene Fabric | Kermel Fabric |
| 0 | 132 | 70 |
| 7 | 35 | — |
| 12 | 0 | — |
| 153 | — | 90 |
| 388 | — | 90 |
| 524 | — | 80 |

Table III shows that silicone rubbers of the no post cure grade methyl-vinyl polysiloxane can when compared with conventional grades of methyl-vinyl polysiloxane, have an improved ability to maintain a good strength when exposed to high temperature pressurised steam. The figures in Table III relating to convention methyl-vinyl polysiloxane silicone rubbers were obtained using Dunlop Limited's precision rubber B452LG grade, based on Midland Silicones Limited's MS2472 grade, and the figures relating to the no post cure methyl-vinyl polysiloxane silicone rubbers were obtained using Dow Corning's 5746 grade.

TABLE III

| Time of exposure to steam at 60 psi and 153°C. (hrs) | Tensile Strength (lb/sq.in) | |
|---|---|---|
| | Conventional methyl-vinyl polysiloxane | No post cure methyl-vinyl polysiloxane |
| 0 | 1060 | 1000 |
| 14 | 866 | 1100 |
| 42 | 685 | 780 |
| 100 | 535 | 785 |
| 140 | 385 | 546 |

EXAMPLE

Twelve inch length samples of silicone rubber steriliser seals, of the cross-section shown in the accompanying drawings, reinforced with (a) polyethylene terephthalate (Terylene) and (b) an aromatic polyamide-imide (Kermel) made according to the present invention were subjected to inflation bursting tests before and after exposure to steam sterilisation cycles at 140°C. The following results were obtained:

| Number of cycles | Burst Pressure (psi) | |
|---|---|---|
| | Terylene fabric reinforced seal | Kermel fabric reinforced seal |
| 0 | 170 | 90 |
| 55 | 110 | 90 |
| 901 | 50 | 90 |
| 2065 | 45 | 90 |
| 4982 | 40 | 90 |

The above Example demonstrates the improved strength retention of the seals of the present invention.

Having now described our invention, what we claim is:

1. An inflatable seal comprising a flexible wall portion and an inflatable chamber defined at least in part by the flexible wall portion, the flexible wall portion being formed from a synthetic reinforced by one or more layers of fabric reinforcement formed from an aromatic polyamide, an aromatic polyimide, or an aromatic polyamide-imide.

2. An inflatable seal according to claim 1 in which the aromatic polyamide is of the general formula:

$$[-R_1CONH\ R_2NHCO-]_n$$

where $R_1$ and/or $R_2$ represent aromatic groups.

3. An inflatable seal according to claim 1 in which the aromatic polyimide is of the general formula:

$$[-R_3(CO)_2N\ R_4N(CO)_2-]_n$$

where $R_3$ and/or $R_4$ represent aromatic groups.

4. An inflatable seal according to claim 1 in which the aromatic polyamide-imide is of the general formula:

$$[-R_5(CO)_2N\ R_6NHCO-]_n$$

where $R_5$ and/or $R_6$ represent aromatic groups.

5. An inflatable seal according to claim 1 in which the flexible wall portion is made at least in part of a silicone rubber.

6. An inflatable seal according to claim 5 in which at least the exterior surface of the portion of the flexible wall is formed from silicone rubber.

7. An inflatable seal according to claim 5 in which the silicone rubber is based on methyl-vinyl polysiloxane.

8. An inflatable seal according to claim 5 in which the silicone rubber is a no post cure grade of methyl-vinyl polysiloxane.

* * * * *